United States Patent
Sant et al.

(10) Patent No.: US 9,824,276 B2
(45) Date of Patent: Nov. 21, 2017

(54) SYSTEM AND METHOD FOR ASSESSING RANGELAND

(71) Applicant: Open Range Consulting, Park City, UT (US)

(72) Inventors: Eric D. Sant, Weston, ID (US); Gregg E. Simonds, Park City, UT (US)

(73) Assignee: Open Range Consulting, Park City, UT (US)

( * ) Notice: Subject to any disclaimer, the term of this patent is extended or adjusted under 35 U.S.C. 154(b) by 146 days.

(21) Appl. No.: 14/686,626

(22) Filed: Apr. 14, 2015

(65) Prior Publication Data

US 2015/0294155 A1    Oct. 15, 2015

Related U.S. Application Data

(60) Provisional application No. 61/979,907, filed on Apr. 15, 2014.

(51) Int. Cl.
*G06K 9/46* (2006.01)
*G06K 9/66* (2006.01)
*G06K 9/00* (2006.01)
*G06T 7/00* (2017.01)

(52) U.S. Cl.
CPC ............ *G06K 9/00657* (2013.01); *G06T 7/00* (2013.01); *G06T 7/97* (2017.01); *G06T 2207/10036* (2013.01); *G06T 2207/20016* (2013.01); *G06T 2207/20076* (2013.01); (Continued)

(58) Field of Classification Search
CPC ......... G06K 9/00657; G06T 7/97; G06T 7/00; G06T 2207/20016; G06T 2207/20076; G06T 2207/20221; G06T 2207/10036; G06T 2207/30188; G06T 2207/20081
See application file for complete search history.

(56) References Cited

U.S. PATENT DOCUMENTS

| 5,657,003 A * | 8/1997 | Fuentes | G01B 11/16 340/686.1 |
| 6,356,646 B1 * | 3/2002 | Spencer | G06K 9/0063 348/144 |

(Continued)

FOREIGN PATENT DOCUMENTS

| EP | 2700906 A1 | 2/2014 |
| WO | WO2006051531 A2 | 5/2006 |

OTHER PUBLICATIONS

Chengquan Huang et al., "A Strategy for Estimating Tree Canopy Density Using Landsat 7 ETM+ and High Resolution Images Over Large Areas"; Published in the proceedings of the Third International Conference on Geospatial Information in Agriculture and Forestry held in Denver, Colorado, Nov. 5-7, 2001.*

(Continued)

*Primary Examiner* — Samir Ahmed
(74) *Attorney, Agent, or Firm* — Parsons Behle & Latimer (57) ABSTRACT

A method for monitoring changes in rangeland includes determining a percent coverage of land cover components in the rangeland, and mapping the land cover components using high resolution imagery. The method further includes linking the mapping to coarser imagery having a larger geographic extent, and interpolating land cover measurements spatially and temporally.

7 Claims, 7 Drawing Sheets

(52) U.S. Cl.
CPC ............. *G06T 2207/20081* (2013.01); *G06T 2207/20221* (2013.01); *G06T 2207/30188* (2013.01)

(56) References Cited

U.S. PATENT DOCUMENTS

| | | | |
|---|---|---|---|
| 7,058,197 B1* | 6/2006 | McGuire | G06K 9/00657 382/100 |
| 7,310,606 B2* | 12/2007 | Nemethy | G01C 7/02 345/419 |
| 7,856,312 B2* | 12/2010 | Coombes | G09B 29/10 340/995.1 |
| 2003/0023412 A1 | 1/2003 | Rappaport et al. | |
| 2006/0170584 A1* | 8/2006 | Romero | A61B 5/0507 342/22 |
| 2006/0276985 A1* | 12/2006 | Xu | G01C 11/025 702/81 |
| 2010/0013927 A1* | 1/2010 | Nixon | G01C 11/06 348/144 |
| 2010/0328449 A1* | 12/2010 | Song | F16M 11/105 348/135 |
| 2011/0264575 A1 | 10/2011 | Kanitra | |
| 2012/0155714 A1* | 6/2012 | Douglass | G06K 9/2018 382/110 |
| 2012/0224772 A1* | 9/2012 | Mitchell | G06K 9/00637 382/190 |
| 2013/0259341 A1* | 10/2013 | Mountney | A61B 5/0035 382/131 |
| 2013/0336540 A1* | 12/2013 | Zhang | G06T 7/40 382/108 |

OTHER PUBLICATIONS

Petit, C et al. "Integration of multi-source remote sensing data for land cover change detection"; International Journal of Geographical Information Science, 2001, vol. 15, No. 8; Mar. 10, 2001.

French, A et al. "Detecting land cover change at the Jornada Experimental Range, New Mexico with ASTER emissivities". Science Direct Remote Sensing of Environment 112: Aug. 20, 2007.

International Searching Authority; International Search Report and Written Opinion for Application No. PCT/US15/26021 dated Sep. 2, 2015.

* cited by examiner

| Cover Type | Ikonos | | Landsat | |
|---|---|---|---|---|
| | $\bar{x}\ R^2$ | s | $\bar{x}\ R^2$ | s |
| Bare ground | 0.82 | 0.08 | 0.87 | 0.02 |
| Herbaceous | 0.81 | 0.13 | 0.90 | 0.01 |
| Shrub | 0.80 | 0.11 | 0.93 | 0.01 |

*FIG. 9*

SYSTEM AND METHOD FOR ASSESSING RANGELAND

PRIORITY CLAIM

The present application claims the benefit of U.S. Provisional Patent Application Ser. No. 61/979,907, filed on Apr. 15, 2014 and entitled SYSTEM AND METHOD FOR ASSESSING RANGELAND, the disclosure of which is incorporated herein by reference in its entirety.

FIELD OF THE DISCLOSURE

The present disclosure relates generally to systems and methods for assessing the condition of rangeland. More particularly, the present disclosure relates to a system and method for monitoring changes in rangeland that integrates remote imagery having a variety of different resolution levels.

BACKGROUND

Rangelands are widely distributed and occupy a large portion of the world's available land. Estimated global land area of rangelands varies widely from as little as 30% to nearly 70% based on the definition of rangelands. Nonetheless, rangelands provide many ecosystem services to human populations around the world. They support almost one-third of the global human population, store about half of the global terrestrial carbon, support 50% of the world's livestock, and contain over one-third of the biodiversity hot spots. The monitoring and assessment of rangelands is thus of great interest. Increasingly, however, the ability of rangelands to continue providing these services is challenged by anthropogenic influence.

There is a desire to monitor changes in rangelands through time and across large geographic areas. Monitoring of rangelands, however, is complicated by the high degree of spatial and temporal variation in vegetation and soil. To provide meaningful information about rangelands involves an evaluation across large landscapes and over extended periods of time. Moreover, semi-arid and arid rangelands are significantly influenced by the quantity and timing of precipitation, creating significant inter-annual variation. Evaluating rangelands and their response to specific management (e.g., grazing) can therefore be difficult. Current field-based methods used to assess and monitor rangelands are limited in their ability to account for spatial and temporal variation. For example, traditional field-based monitoring is usually insufficient to accurately assess ecological status or to detect important changes across large geographic areas outside of the plot extent. Increasing the number of traditional ground-based monitoring plots across large spatial and temporal scales is often prohibitively expensive and still has limited evaluative capabilities.

The inadequacies of traditional ground-based sampling for rangeland assessment could be one reason that the largest rangeland management entity in the United States, the United State Department of Interior-Bureau of Land Management (USDI-BLM), has only inventoried an average of 0.6% of its national land holdings annually (~113 million hectares) from 1998-2007, resulting in 5.4% being inventoried over this time period. Often, land-use plans are renewed without formal assessment of rangelands, as required by the National Environmental Protection Act (NEPA). Most grazing allotment renewals in the past few decades have been completed via a "grazing rider" attached to the Department of Interior's Appropriation Bill. This renewal process keeps in place the terms and conditions of previous allotment management plans without assessing whether "Standards and Guidelines" of rangeland health are satisfied. This lack of feedback limits the ability of land managers to improve knowledge of the systems' ecology and to respond adaptively.

The present application relates to one or more of the above issues.

SUMMARY

It has been recognized that it would be desirable to have a system and method that integrates the use of high resolution photography as enhanced ground samples and as a training dataset for rangeland assessment using remote sensing techniques.

It has also been recognized that it would be desirable to have a system and method for cost effective assessments of rangeland with high spatial resolution and improved accuracy.

It has also been recognized that it would be desirable to have a system and method for assessing public land grazing allotments for renewal or habitat quality for sensitive wildlife species that allows improved management prescriptions.

In accordance with one embodiment thereof, the present application discloses a method for monitoring changes in rangeland. The method includes determining a percent coverage of land cover components in the rangeland, and mapping the land cover components using high resolution imagery. The method further includes linking the mapping to coarser imagery having a larger geographic extent, and interpolating land cover measurements spatially and temporally.

In accordance with another embodiment thereof, the present application provides a method for monitoring changes in rangeland, including developing percent coverage data representing percent coverage of each functional group of vegetation in each image of high resolution imagery of the rangeland, and producing detailed ground samples from the percent coverage data. The method further includes using mid resolution imagery of the rangeland and the percent coverage data together to model a percent cover of each functional group for each pixel, and developing a landscape level characterization of the rangeland, and using low resolution historical imagery of the rangeland and the percent cover of each functional group for each pixel together to develop a temporal/landscape characterization of the rangeland. The method further includes combining the detailed ground samples, the landscape level characterization, and the temporal/landscape characterization into a digital map of vegetative cover components of the rangeland.

In accordance with yet another embodiment thereof, the present application provides a method for monitoring changes in rangeland, including obtaining high resolution imagery of a region of the rangeland, the high resolution imagery having a resolution of less than about 10 mm, obtaining mid-resolution imagery of the region, and obtaining coarse resolution historical imagery of the region. The method further includes mathematically integrating the high resolution imagery, the mid-resolution imagery and the coarse resolution imagery to obtain a condition assessment of the region of the rangeland.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

As noted above, meaningful monitoring of rangelands suggests an evaluation across large landscapes and over extended periods of time. Unfortunately, traditional field-based monitoring is usually insufficient to meet these criteria, and can be inaccurate and expensive, with limited evaluative capabilities. This lack of good and timely data can limit the ability of land managers to improve knowledge of a particular land systems' ecology and to respond adaptively.

Advantageously, the application of remote sensing technology to rangeland assessment has the potential to address some of the limitations of prior rangeland monitoring methods. An alternative approach is disclosed herein which can allow assessment of rangelands using high resolution imagery as enhanced ground samples and multi-spatial remote sensing imagery in order to quickly, cheaply, and effectively map basic land cover components. The high resolution imagery can be high-resolution, ground-based natural color vertical photography ("GBVP"), and captures, in space and time, percent cover of vegetative and abiotic components at the plot level. This imagery maintains a visual history of percent cover allowing other investigators the ability to repeat the observation or use other sampling techniques to extract improved or additional information. These plot-based measures are then mathematically linked or related to airborne or satellite acquired imagery allowing for extrapolation of ground measurements across large landscapes. Linking plot-based measures to remotely sensed imagery can allow for documentation of change across many years utilizing Landsat imagery.

It is to be understood that, in addition to the ground-based natural color vertical photography (GBVP), the high resolution imagery can be from sources other than ground based sources (e.g. drone and/or aerial imagery), and it can be other than natural color (e.g. color infrared, radar, etc). As a general matter, the term "high resolution imagery" is used herein to refer to any suitable imagery that has a resolution equal to or less than about 10 mm, and that can captures, in space and time, percent cover of vegetative and abiotic components at the plot level. The high resolution imagery can include GBVP imagery or other suitable types. All references to GBVP imagery in this disclosure are to be understood as indicating only one of many possible sources or types of high resolution imagery, whether from ground-based, aerial or other sources. The system and method disclosed herein integrates this high resolution imagery with other imagery to extrapolate and enrich the assessment of ground cover over large spatial and temporal extents.

While coarse resolution remote sensing technology cannot directly identify plant species, it has had success in determining percent ground cover using vegetation indices like the Normalized Difference Vegetation Index (NDVI) at coarse resolution like 30 m Landsat imagery. Percent ground cover is not, in itself, an indicator of range condition, but when assessed over large landscapes and over long time periods, the patterns of percent ground cover change caused by management action can be separated from changes due to climatic variability, soils, or geomorphology.

Using remote sensing technology, researchers have mapped percent cover of basic vegetative components over big sagebrush (Artemisia sp.) landscapes of the western United States. They used regression tree analysis on multi-scale imagery with three nested spatial scales including traditional on-the-ground field sampling, Quickbird 2.4 m imagery, and Landsat 30 m imagery to predict percent cover. Additionally, NDVIs were created from Quickbird and Landsat imagery to predict cover. To assess the accuracy of the multi-scale and NDVI predictions, correlation coefficients were determined using a linear regression of the predicted values against independent ground-based vegetation measurements. The correlation coefficients of the nested multi-scale predictions were $R^2=0.51$ for Quickbird imagery and $R^2=0.26$ for Landsat imagery. The Quickbird and Landsat NDVI predictions were $R^2=0.18$ and $R^2=0.09$ respectively. These results, while promising for very large scale assessment and planning, are not precise enough on a scale to support local adaptive resource management.

The desire for cost effective assessments of rangeland with high spatial resolution and improved accuracy for management applications has stimulated research in the use of high-resolution photography for rangeland assessment. High resolution, nadir photography can serve as a realistic ground plot. It is information rich, understandable to a broad base of people, and the unanalyzed information can be archived for future use. This ability to revisit imagery that documents actual field conditions at the time of collection is not possible through conventional field data collection techniques. Archived field plot imagery can therefore be reviewed by many observers at later times using potentially improved or multiple techniques to record land cover. High resolution imagery, less than 1 cm, is being used by a number of researchers. Results to date are mixed, but strong correlation coefficients of $R^2 \sim 0.90$ have been observed for bare ground. Using high resolution imagery, other researchers have found that photography-based grid point intercept (GPI) in Great Basin plant communities was strongly correlated to line point intercept (LPI) but it was 20-25 times more efficient, identified 23% more plant species, and was more precise in determining percent cover. Furthermore, they found that GPI could precisely estimate cover of basic vegetation components when they exceeded 5-13% while LPI cover estimates had to exceed 10-30% cover for equal precision. Detecting change when percent cover is low is very important in arid lands where land cover is typically sparse.

Disclosed herein is a system and method for assessing rangeland that integrates the use of high resolution photography as enhanced ground samples and as a training dataset for multiple scales of remotely sensed imagery. This method models the percent cover of bare ground, shrub, and herbaceous vegetation cover across big landscapes in the western United States. It can provide information on sagebrush dominated rangelands at spatial scales from millimeters to kilometers, across multiple years. This method maps commonly used and functionally important cover types with considerable success and increased precision.

Figure 1:
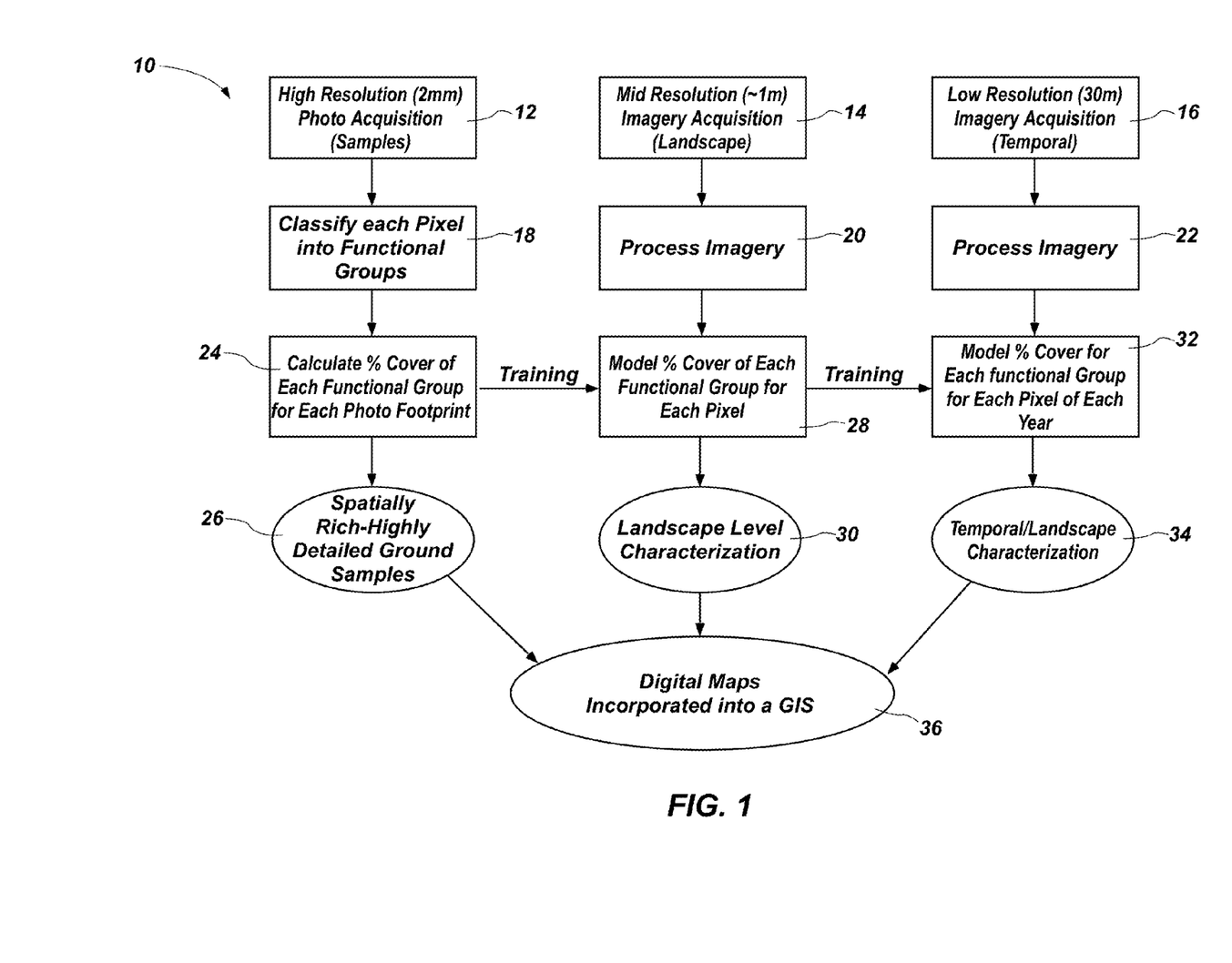
FIG. 1 is a block diagram of an embodiment of a method for assessing rangeland, in accordance with the present disclosure.

Shown in FIG. 1 is a flowchart showing the steps in an embodiment of a method for assessing rangeland in accordance with the present disclosure. As shown in FIG. 1, the method, generally indicated at 10, includes acquiring high resolution (e.g. 2 mm) photo images of a rangeland region (block 12), obtaining mid-resolution (e.g. 1 m) images of the rangeland region (block 14), and obtaining low resolution images (e.g. 30 m) of the rangeland region (block 16). The high resolution images can be referred to as "samples," the mid-resolution images as "landscape," and the low resolution images as "temporal" images. The high resolution images are processed to classify each pixel into functional groups (block 18). The mid-resolution imagery is also processed (block 20) as is the low resolution imagery (block 22). The classified high resolution imagery is used to determine a percent coverage of each vegetation functional group for each photo footprint (block 24). This step involves determining the land cover of every pixel of the high resolution imagery, and mapping land cover over every pixel within the imagery. This data is used to produce a spatially rich and highly detailed ground sample (block 26), which maps the land cover components using the high resolution imagery.

The data of block 24 is also used as training data in conjunction with the processed mid-resolution imagery (block 20) to model a percent of cover of each functional group for each pixel (block 28). In this process, the high resolution mapping is thus mathematically linked or related to remote images that have coarser resolutions with continuous and larger geographic extents This modeling step allows the system to prepare a landscape level characterization (block 30) of land cover components by linking the high resolution mapping to imagery with a larger geographic extent. Finally, the data from block 28 is used as training data in conjunction with the processed low resolution imagery (block 22) to model a percent coverage of each functional group for each pixel for each year (block 32). In this step the remote imagery is mathematically linked or related to coarser resolution remote imagery that has been taken with regularity and frequency over a period of time, thus allowing for temporal change analysis. This data is used to produce a temporal/landscape characterization (block 34) which interpolates land cover measurements spatially and temporally.

The spatially rich and highly detailed ground sample data (block 26), the landscape level characterization (block 30) and the temporal/landscape characterization (block 34) are linked or combined to produce a digital map that can be incorporated into a global information system (GIS) of the subject rangeland (block 36).

Additional details regarding the procedures associated with each of the steps shown in FIG. 1 are provided and discussed below, particularly with respect to the Deseret Land and Livestock (DLL) ranch Example provided below. Because this process starts at a relatively fine scale, the coarser scales can be informed with precision and accuracy. Moreover, the basic percent of land cover components can be interpolated over space and time, and monitoring results can be increased as to their accuracy, precision, and timeliness over large geographic and spatial extents.

Figure 2:
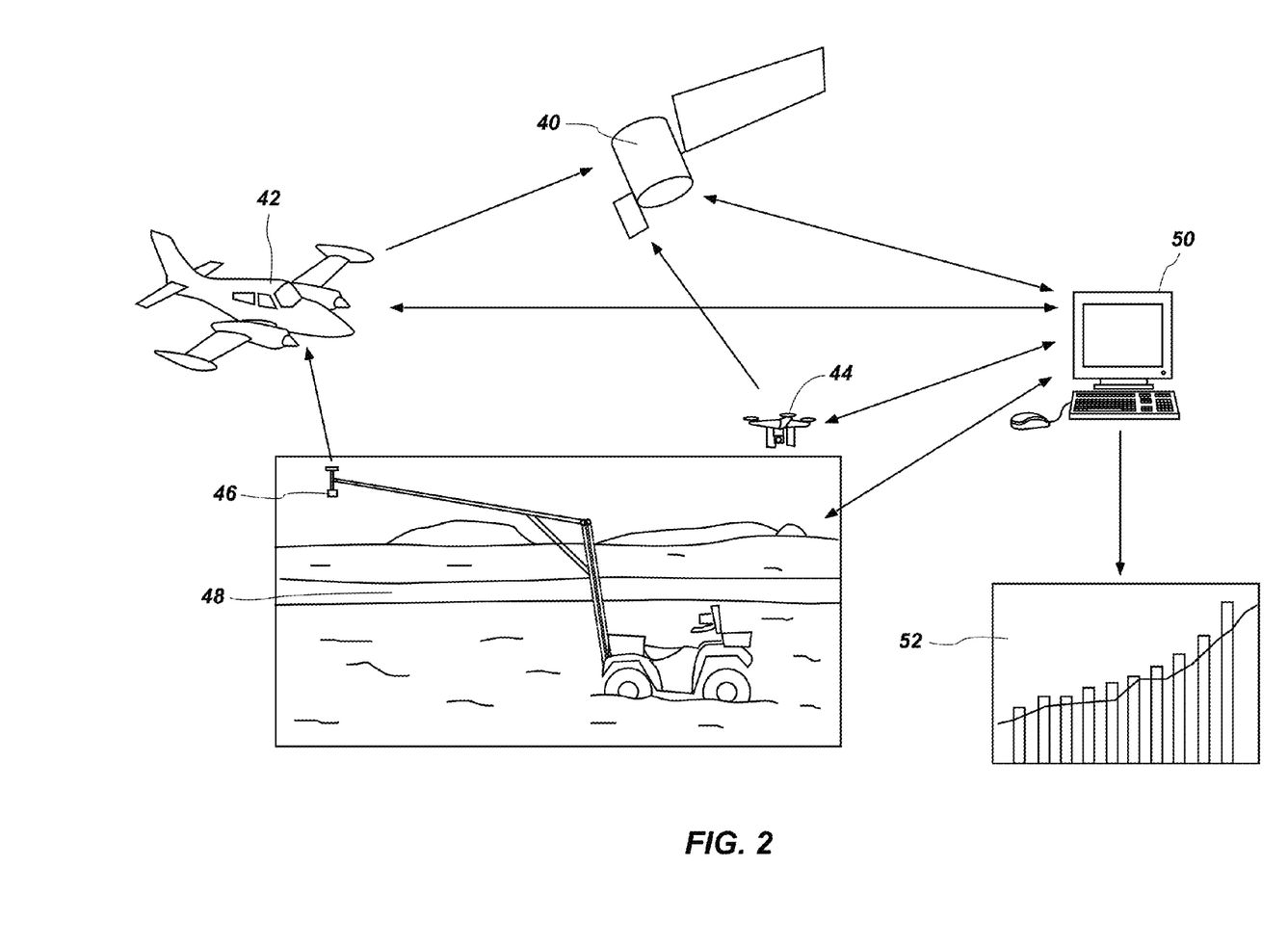
FIG. 2 is a schematic diagram of an embodiment of a system for assessing rangeland, in accordance with the present disclosure.

As shown in FIG. 2, an embodiment of a method for assessing rangeland in accordance with the present disclosure can be accomplished by obtaining imagery from one or more of a satellite 40, an aircraft 42, and a drone 44. High resolution imagery can also be obtained from ground-based equipment, such as a boom-mounted camera 46 for taking ground-based color vertical photography (GBVP). The boom-mounted camera 46 can also include a GPS transceiver, for accurately noting the location of images, and these images are downloaded or transmitted in some way to a computer system 50 to allow linking of the high resolution (e.g. GBVP) images with the other imagery. This can include wired or wireless transmission directly to the computer system 50 or to the computer system 50 via some intermediary transmission device. Whatever the method of transmission of the data, all of the imaging devices take ground-based, aerial or space-based images of the rangeland 48. This imagery is relayed to the computer system 50, which receives and analyzes those images, and provides output to a user, such as in the form of graphs, charts, or other metrics, indicated generally at 52.

Remote sensing using ground, air and space-borne electro-optical sensors at various spatial and spectral resolutions has been shown to be effective at mapping land cover and estimating condition of rangeland. Thus detecting changes in rangeland with the use of remote sensing technology at appropriate spatial, spectral, and temporal resolutions can be a simple, acceptable, and cost-effective means of monitoring rangeland conditions and trends. Furthermore, evaluating current conditions in the context of historical impacts using remote sensing could guide future management and provide information on the effectiveness of management actions related to rangeland.

Example: Desert Land and Livestock Ranch

The method disclosed herein was applied to a sagebrush-steppe landscape in northern Utah with promising results. Specifically, an embodiment of the method disclosed herein was applied and assessed in a rangeland study area in the Western United States. Extrapolation of percent vegetation cover data extracted from high-resolution imagery (e.g. ground-based natural color vertical photography) to 1 m resolution Ikonos imagery using Regression Tree Analysis resulted in an overall $R^2$ value of 0.81 while an extrapolation to 30 m Landsat Thematic Mapper resulted in an $R^2$ of 0.90 using a 5-fold cross-validation. A comparison between independently acquired ground measurements from multiple time intervals showed a moderately strong correlation of $R^2=0.65$ for Landsat Thematic Mapper. This technique has great potential to place land cover change and rangeland health in a contextual perspective that has not been available before. In this way, past management practices can be evaluated for their effectiveness in altering basic cover components of rangelands. With this hindsight, improved management prescriptions can be developed providing a valuable tool in assessing public land grazing allotments for renewal or habitat quality for sensitive wildlife species like greater sage-grouse.

Figure 3:
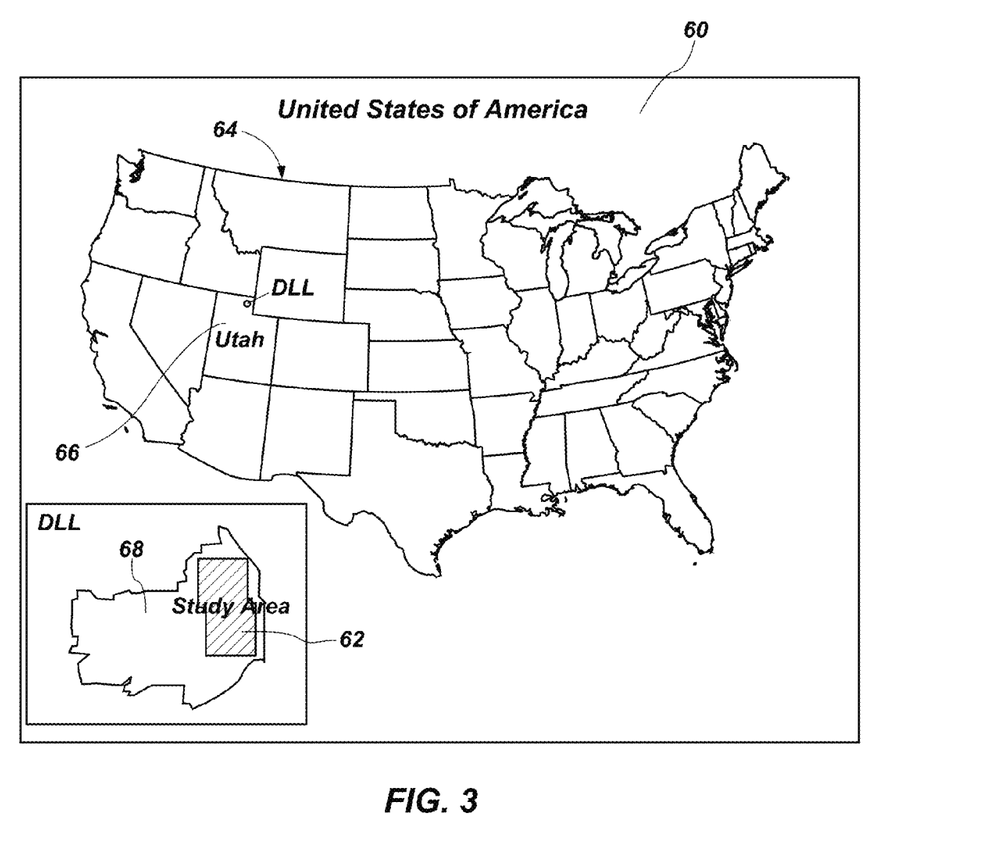
FIG. 3 is a map of the study area location.

Provided in FIG. 3 is a map 60 of the location of the study area 62 in relation to the United States 64 and the state of Utah 66. The study area 62 is part of the 20,263 ha Deseret Land and Livestock (DLL) ranch 68 in Rich County, Utah, USA, in the Middle Rocky Mountains physiographic region. The study area is bounded north to south by 41.439° N and 41.258° N and east to west by 111.057° W and 111.195° W. The ranch ranges in elevation from 1,928 to 2,270 m Annual precipitation has ranged from 11 cm to 40 cm with an average of 24 cm since 1897. Temperatures during this same period averaged a low of −18° C. in January and a high of 28° C. in July. Dominant landcover types include short sagebrush (*A. nova* and *A. arbuscula*) and big sagebrush (*A. tridentate*). Where big sagebrush communities had been treated (mechanical, fire, or herbicide), crested wheatgrass (*Agropyron desertorum*) was dominant. The study area consisted of 12 ecological sites, four of which (Semi-desert Stony Loam, Semi-desert Clay, Upland Loam, and Semi-desert Loam) accounted for 95% of the land area. Ecological sites are a distinctive kind of land with specific characteristics that differ from other kinds of land in its ability to produce a distinctive kind and amount of vegetation. Ecological sites and their descriptions are mapped and organized through the United States Department of Agriculture, Natural Resource Conservation Service.

To assess rangelands at different spatial and temporal scales, the study focused on the basic ground cover types of bare ground, shrub, and herbaceous vegetation for several reasons. First, these basic cover types show less inter-annual variation associated with climatic conditions compared to responses of individual species. Second, they can be compared to ecological site descriptions which are benchmarks currently used in monitoring rangelands. Third, percent bare ground is indicative of water sequestration in a watershed because it is highly correlated to infiltration. Fourth, each of these general cover types can be discerned remotely at low cost across large spatial and temporal extents. Finally, the values of these basic ground cover types, when assessed remotely, can be helpful when making decisions that affect management decisions such as allotment renewals.

Figure 4:
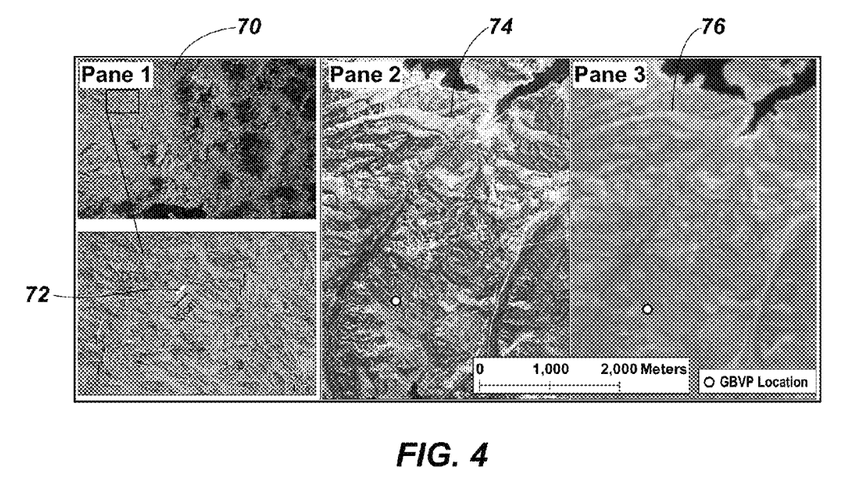
FIG. 4 provides multiple satellite image panes that show differences in detail in imagery used in the assessment of rangelands across multiple spatial and temporal scales.
Figure 6:
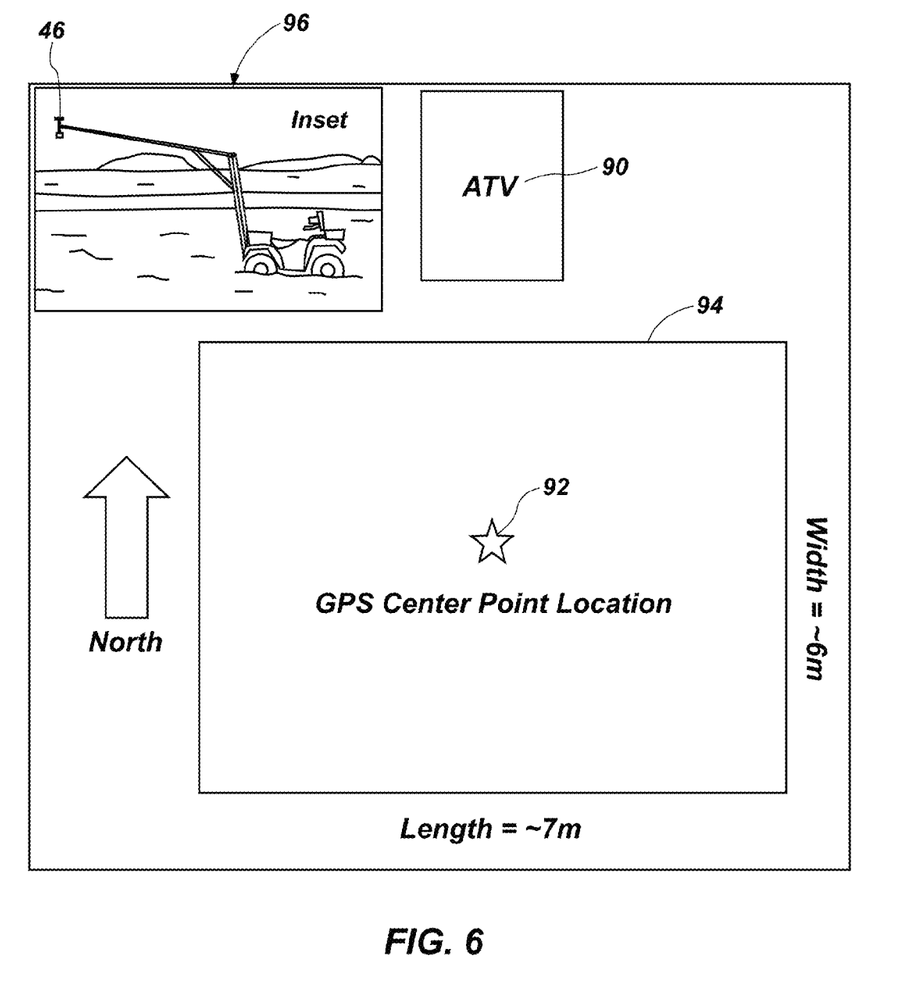
FIG. 6 is a diagram of the logistics of the GBVP image footprint.

Using ground-based color vertical photography (GBVP) at 2 mm spatial resolution to obtain the desired high resolution imagery, canopy cover for each field site was estimated, and these estimates were used as training to model percent cover of each basic ground cover category across the study area using coarser satellite based (Ikonos 1 m and Landsat 30 m) imagery. Shown in FIG. 4 are multiple image panes that show differences in detail of imagery used in the assessment of rangelands across multiple spatial and temporal scales. Pane 1, indicated at 70, shows two examples of the ground-based color vertical photography (GBVP) images, and shows the high detail of the 2 mm GBVP imagery as well as the color-coded nails 72 used for accuracy assessment. Pane 2, indicated at 74, displays the 1 m Ikonos imagery. Pane 3, indicated at 76, illustrates the coarser 30 m Landsat imagery. Water and sparse vegetation are also discernable in Panes 2 and 3. To model temporal changes in percent cover, radiometrically normalized Landsat imagery collected across time was used to model the same general land cover types for each historic image. GBVP images consisted of digital photographs oriented vertically (nadir view) taken with an 18-megapixel, 10 mm focal length, Canon Digital Rebel T2i camera mounted to a boom attached to an All-Terrain Vehicle, as shown in FIG. 2. Site locations were recorded with a high precision Trimble Omnistar Pro XS GPS with a real-time accuracy of 10 cm. All GBVP images were collected with the top of the image-oriented north to facilitate registration with other imagery. The image scale was calculated with the following equation:

$$(SAW*LH)/(FL) = \text{Image Scale} \quad [1]$$

where SAW=Sensor Array Width, LH=Lens Height and FL=Focal Length. The image scale was multiplied by the length and the width of the image in pixels to create a precise (±10 cm) geographic footprint of the image, as shown in FIG. 6. This figure diagrams the logistics of the GBVP image footprint. The ATV 90 is oriented north with the camera and GPS 46 extended behind it. Because the center point 92 of the photo 94 is known along with the height and focal length of the camera lens, a very precise footprint of the image is delineated, as indicated by the length and width measurements shown along the edges of the photo outline 94. The average cover of shrub, herbaceous, litter, and bare ground within the GBVP footprint serve as the enhanced on-the-ground sample which is the baseline training dataset for the multi-scale imagery. The Inset 96 shows a photograph of the actual GBVP platform. Differences in terrain and ATV uphill or downhill orientation resulted in a difference in lens height and consequently image scale. On average, the lens height was 355 cm with a standard deviation of 24 cm, and the area of the footprint was 42 $m^2$ with a standard deviation of 5 $m^2$.

Eighty GBVP images were collected during late July and early August of 2010. This time frame corresponded to maximum vegetation greenness. Moreover, it minimized shadow as sun elevation is maximized during this time of year in the Northern Hemisphere. Images were also captured between 9:00 a.m. and 5:00 p.m. local time to minimize shadow effects. Sampling locations were restricted to areas of homogenous vegetation of at least 8.5 m by 5 m to match the nominal image footprint size. Sampling focused on capturing enough plots to provide a wide range of cover conditions. In other words, within the GBVP training dataset there are images that recorded low, medium, and high shrub, bare ground, and herbaceous cover.

After the GBVP images were collected, the percent cover was assessed for each of the 80 images by classifying the pixel color values into the three basic ground cover types as well as litter and shadow using the Visual Learning Systems Feature Analyst Software 5.0.0.119™ (2010). For each image, a minimum of five samples for each of the ground cover types were digitized as polygons by visually assessing the image and digitizing small areas of the appropriate ground cover type. The average polygon size was 50 $mm^2$ with a standard deviation of 20 $mm^2$. These polygons served as training samples to classify the remaining image pixels on that image using the "Land Cover Feature" and "Manhattan Input Representation" algorithms within the Feature Analyst Software. This classification resulted in an estimate of percent cover for the basic cover types of shrub, herbaceous, litter, shadow, and bare ground for each GBVP footprint.

Each image was classified individually to overcome differences in soil color, degree of stone cover, and cryptobiotic cover between images. Because of the inability to differentiate between standing and laying litter, all litter was classified as one class. Shadow was classified for each image but was not included as part of the percent cover of each category. It was therefore assumed that shadow obscured ground cover in similar proportion across all four categories (shrub, herbaceous, litter, and bare ground). The influence of shadow can preclude the applicability of this technique to areas where a large portion of the canopy is composed of trees. However, the application of this method to low structured rangeland vegetation, like sagebrush, should result in relatively small errors from shadow if images are collected at high solar angles. Processing of GBVP images were performed by specialists with extensive field and image classification experience. Each GBVP image involved approximately one hour to process.

Ikonos imagery was acquired on Aug. 11, 2010 and registered to 1 m National Agricultural Imagery Program (NAIP) imagery using a direct linear transform and 10 m digital elevation models with a root mean square less than 0.05 m. To map percent cover across the landscape, the results of the classification for each GBVP footprint were used to train the Ikonos 1 m, 4-band, imagery. Percent cover was modeled with regression tree analysis (RTA) using the four Ikonos spectral bands (band 1, 445-516 nm; band 2, 506-595 nm; band 3, 632-698 nm; and band 4, 757-853 nm), as well as derived brightness and greenness, NDVI (band 4−band 3)/(band 4+band 3), Green Normalized Difference Vegetation Index (GNDVI) (band 4−band 2)/(band 4+band 2) and a moisture normalized difference index (band 4−band 1)/(band 4+band 1), as explanatory variables. A combination of a regression tree program in R (R Development Core Team 2008), and ArcMap 10.1 were used for analysis. R was used to create the predictive model and ArcMap was used to apply the model spatially for each image pixel. The output consisted of four canopy cover maps representing the percent cover of shrub, litter, herbaceous and bare ground.

In order to model percent cover for the coarser spatial resolution Landsat imagery collected for the same summer (Jul. 19, 2010) as well as through time, a similar regression tree model was developed for Landsat imagery using the Ikonos derived percent cover products as a source of training data. Once the model was developed and tested for the Jul. 19, 2010 image, the same model was applied to Landsat imagery collected in multiple years from 1993-2006 and radiometrically normalized to the Jul. 19, 2010 image. Level 1T Landsat images were downloaded from the United States Department of Interior-United States Geological Survey (USDI-USGS), Earth Explorer website and re-projected to the UTM zone 12 NAD83 coordinate system to match other data layers in this study. The 2010 Landsat image was converted to percent reflectance and normalized for sun angle. To model three categories of canopy cover (shrub, herbaceous, bare ground), the six reflective Landsat spectral bands (band 1, 45-52 nm; band 2, 52-60 nm; band 3, 63-69 nm; band 4, 76-90 nm; band 5, 155-175 nm; and band 7, 208-235 nm) were used. The same spectral indices that were extracted for the Ikonos image (brightness, greenness, NDVI, GNDVI, and moisture normalized index) as described above were also derived for the Landsat image using the appropriate Landsat bands.

The three Ikonos-derived canopy cover maps of shrub, herbaceous, and bare ground were used as training data for the Landsat derived cover using RTA. Litter cover was not successfully modeled with Landsat imagery. In order to use the Ikonos continuous cover data as a training source, the Ikonos percent cover values were averaged (rounded to the nearest whole number) for each of the 136,083 Landsat pixels covering the study area. Hereafter, this will be referred to as Ikonos Averaged Continuous Cover (IACC). Because of computational limitations, a subset of 1000 IACC pixels was selected to create the RTA model.

Figure 5:
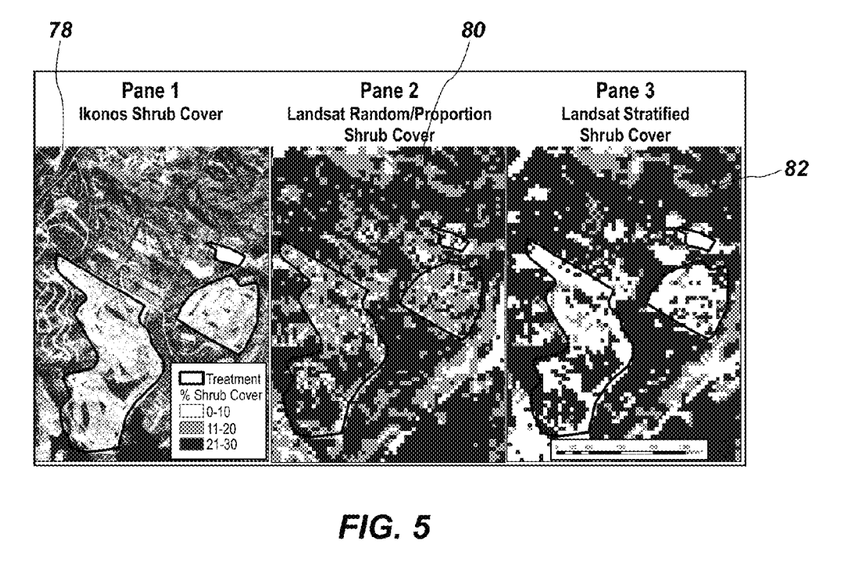
FIG. 5 provides three panes of modified satellite imagery showing shrub cover models using different pixel sampling methods.

The selection of the 1000 IACC pixel training subset proved helpful in the successful creation of RTA models for Landsat imagery. The non-linear relationship between multispectral reflectance and percent cover and the propensity of RTA to over-fit models suggested a proper sampling of the variation in percent cover. An underrepresentation of pixels in the low percent cover categories (e.g., <10% shrub cover) is the outcome if samples are not carefully selected. To overcome this sampling problem a stratified sample based on a transformation that reapportioned the number of samples to include a higher proportion of low percent cover pixels was created. The results of this method proved to more closely match the Ikonos percent cover prediction than either a strict random or proportionate random sampling. The images in FIG. 5 illustrate the value of selectively picking sample pixels instead of using a random or proportional sample. Pane 1, indicated at 78, is the shrub percent cover estimated using the 1 m Ikonos imagery. Pane 2, indicated at 80, illustrates the results of the shrub percent cover model of 30 m Landsat imagery if the samples are selected randomly or proportionally. Pane 3, indicated at 82, demonstrates the results of the shrub percent cover model of 30 m Landsat imagery when sample selection is stratified and a higher percentage of low shrub cover pixels are used in the model. Therefore, 1000 IACC pixels were selected as a training sample by transforming the percent cover frequency of each of the three basic cover types using the following transformation:

$$1/(\text{percent cover value/number of occurrences}) \quad [2]$$

By applying this transformation, the resulting Landsat-derived percent cover more closely matched the distribution of the Ikonos derived continuous cover.

The pixel frequency stratification specified how many IACC pixels to select from each one-percent cover increment (0%, 1%, 2% . . . 30%, etc.). Samples selected for each percent cover category were selected based on those aggregated IACC pixels that had the lowest standard deviation values to ensure low landscape variation within the candidate Landsat pixels.

Once a satisfactory model of percent cover of the three basic cover types was created for the 2010 Landsat image, it was applied to Landsat imagery collected in previous years to temporally assess percent cover. Historic July Landsat imagery was selected from the following years: 1993 and 1995-2006. There was no summertime cloud free image available for 1994. All images were downloaded and received the same pre-processing (conversion to reflectance, solar angle normalization) as the 2010 image. Additionally, multi-temporal images were radiometrically normalized to the 2010 image using a Pseudo Invariant Features (PIF) process.

Accuracy of each output was assessed using several methods and datasets. Traditional on-the-ground cover sampling was used to assess the GBVP image classifications. With the 2010 percent cover models created from the Ikonos and Landsat imagery, a 5-fold cross validation was used to determine the accuracy and repeatability of the model. The percent cover of shrub derived from the Ikonos and Landsat imagery was further assessed using independently gathered on-the-ground techniques. Accuracy of temporal outputs was determined using historical sagebrush treatments. Changes in bare ground, shrub, and herbaceous cover were compared to expected changes in these components from other non-related studies.

The accuracy of the GBVP classification was determined using color-coded nails. This method was an adaptation of the on-the-ground cover sampling technique described in 1959 by Daubenmire. Three-hundred-sixty nails (5.08 cm in length) were wrapped in colored tape where each color was correlated to a basic cover type (white=bare ground, yellow=litter, green=herbaceous, and blue=shrub). The color-coded nails were then placed within 21 different GBVP footprints so that they would be visible in the image. The nails were placed in locations that were clearly one of the basic ground cover types. Each color-coded nail in the photo was identified and the location point buffered by 6 cm. If the majority of classified pixels within the buffer agreed with the color-coded nail, the cover type was correctly mapped.

In order to estimate the repeatability of the model, a 5-fold cross validation process was used. The 5-fold cross validation estimated the expected level of fit of the percent cover models to the independent dataset that was used to train the model. This consisted of using different sample subsets within the training dataset to create five different models. In each of the five iterations, 80% of the total samples were randomly assigned as training and 20% as validation. The validation samples were regressed against the predicted values of the model to determine the correlation coefficient or $R^2$ value. The results are reported as a mean and standard deviation of the $R^2$ of the five iterations.

Figure 7:
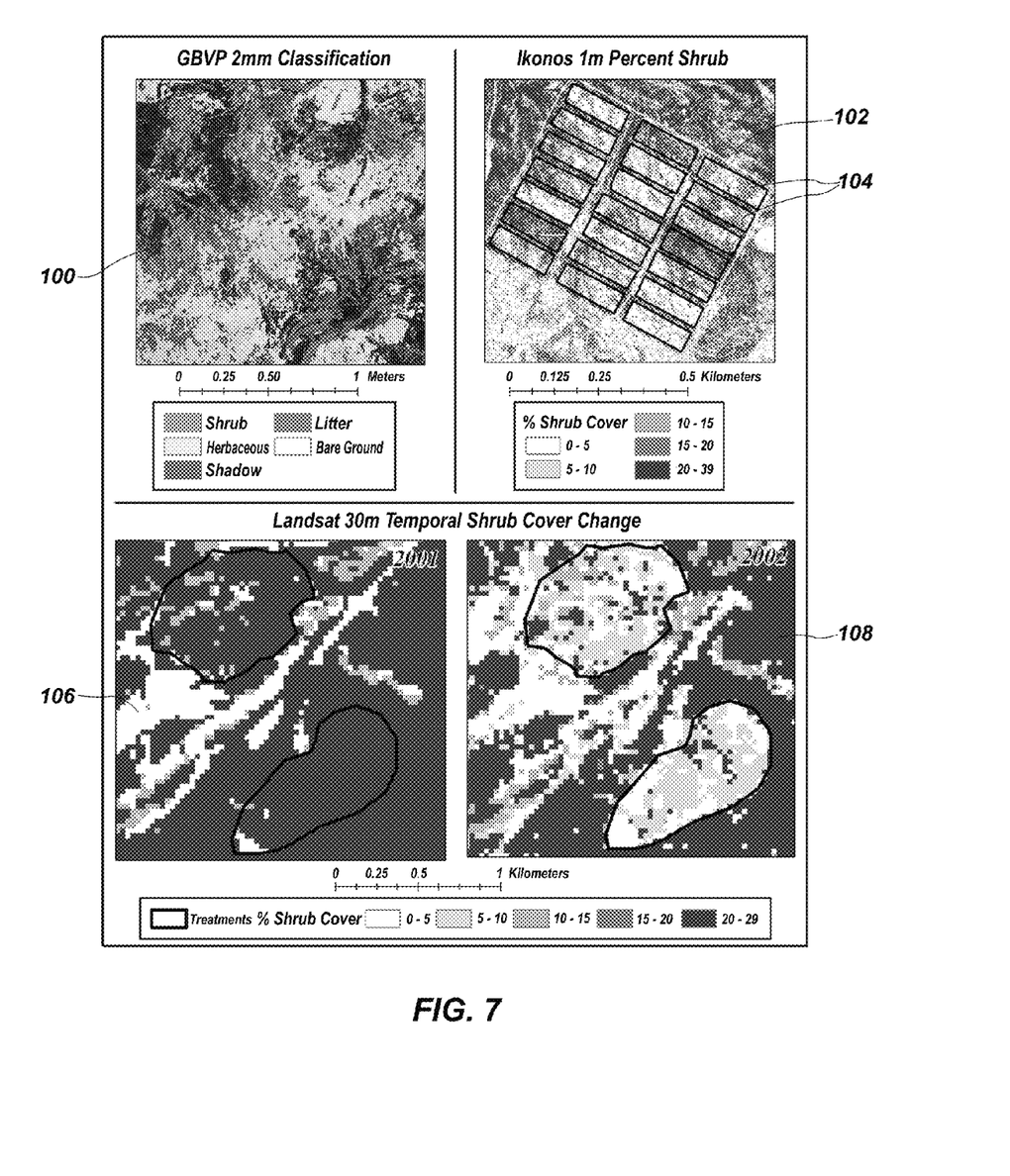
FIG. 7 provides modified satellite images assessing percent cover on different image scales.

Additionally, accuracy was assessed using an independent study funded by the Wildlife Federal Aid Project W-82-R that investigated the effectiveness of six different sagebrush removal techniques against a control where sagebrush was not removed. This data set served as an independent validation of the remotely estimated shrub cover. The six sagebrush removal techniques as well as control plots were replicated three times. Each treatment plot consisted of a 1.1 ha strip (61 m by 183 m) surrounded by a 15 m buffer of untreated sagebrush. Blocks for each replication were separated by 40 m strips to allow adequate space for equipment to move from plot to plot. Shown in FIG. 7 are results of assessing percent cover on different image scales. The GBVP classification is illustrated in high detail in the photograph in the upper left hand corner of FIG. 7, indicated at 100. The Wildlife Federal Aid Project W-82-R treatments are shown on the Ikonos shrub cover in the upper right hand corner image, indicated at 102. This image outlines 21 specific plots 104 that were sampled for shrub cover. The Landsat temporal results (lower half) illustrate the difference in shrub cover before and after a treatment. Shrub cover was assessed in 2001 before treatments began, as shown in the image at 106. Following the treatments in 2002, shrub cover assessments were made for 2002, 2003, 2006, and 2010. The shrub cover assessment for 2002 is shown in the image indicated at 108. These assessments utilized a line-intercept technique to sample the 21 plots 104 for shrub cover. The line-intercept shrub cover measurements from each of the 2010 shrub cover assessments were regressed against the average shrub cover of each of plots derived from the RTA to determine a correlation coefficient.

The Landsat temporal percent cover predictions were assessed with two datasets. The first was the Wildlife Federal Aid Project W-82-R described above. The second validation data set consisted of large-scale historical sagebrush removal treatments. The Wildlife Federal Aid Project W-82-R validation set consisted of field-based shrub percent cover measurements in 2001 before sagebrush treatments and in 2002 after sagebrush treatments. The difference in each plot's percent shrub cover between 2001 and 2002 as measured with the line-intercept method was regressed against the average difference between the RTA derived percent shrub cover for 2001 and 2002 for each treatment polygon to determine the correlation coefficient. The second validation data set consisted of 11 large-scale sagebrush removal treatments from 1993 through 2006. These treatments included aerating, disking, and burning. The ability of the Landsat temporal predictions to detect change was also assessed using these treatments. For each treatment, a polygon was delineated within the treatment area and in an adjacent untreated area that occupied the same ecological site. The difference in the percent shrub cover of the treated polygon before and after the treatment was compared to the difference before and after the treatment within the untreated polygon. This measured change was compared to expected changes within sagebrush treatments based on literature from other non-related sagebrush treatment studies.

Figure 9:
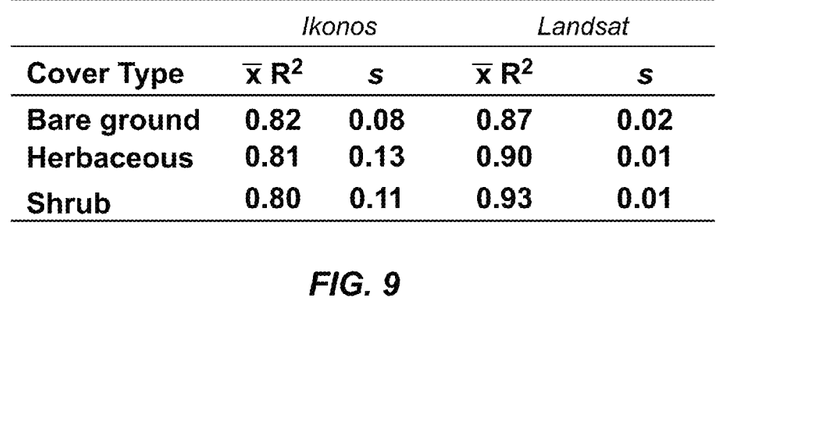
FIG. 9 is a table showing the results of a 5-fold cross validation of Ikonos and Landsat percent cover models.

The color-coded nail assessment of the GBVP imagery resulted in an overall accuracy of 94%. Individual component accuracies were 99% for bare ground, 95% for litter, 92% for herbaceous, and 90% for shrub. As shown in Table 1, provided in FIG. 9, for the Ikonos and Landsat imagery-derived cover estimates, the 5-fold cross validation showed strong correlations between predicted values and the withheld training samples with very low standard deviations, indicating that the model was accurate and repeatable. The predicted average shrub cover values from the 2010 Ikonos and Landsat RTA models were highly correlated to shrub cover collected independently on-the-ground on Wildlife Federal Aid Project W-82-R in 2010. The Ikonos RTA prediction had an $R^2$ value of 0.85 and p-value less than 0.01. The Landsat RTA prediction had an $R^2$ value of 0.81 and a p-value less than 0.01.

Shrub cover change predictions for 2001 and 2002 derived from Landsat imagery were assessed using the difference derived from the independent field-based Wildlife Federal Aid Project W-82-R data collected in 2001 and 2002. This resulted in a moderately strong correlation with an $R^2$ of 0.65 and a p-value less than 0.01. Because treatments were small (60 m by 180 m) and not oriented directly north and south there was a considerable amount of pixel mixing when using the north-south oriented 30 m Landsat pixels. This geometric difference could have influenced the moderate correlation.

Figure 8:
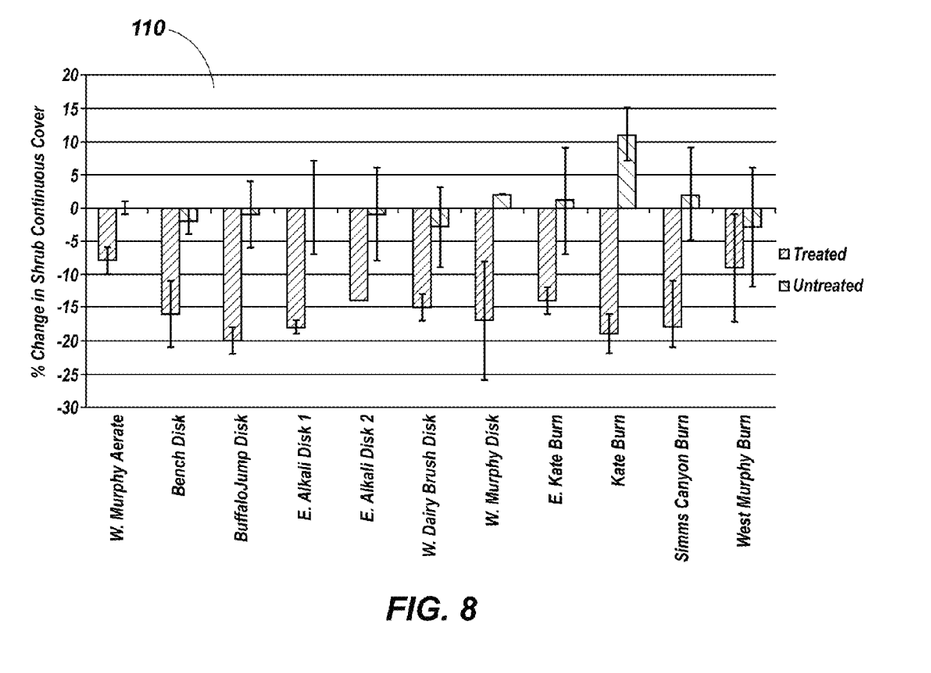
FIG. 8 is a bar graph showing the change in shrub cover detected using Landsat 30 m imagery for each of the sagebrush removal treatments.

Within the 11 large-scale sagebrush removal treatments, Landsat derived estimates for treated plots showed an average shrub decrease of 15% versus untreated plots that had an average shrub increase of less than 1%. These results are illustrated in FIG. 8, which provides a bar graph 110 that shows the change in shrub cover detected using Landsat 30 m imagery for each of the sagebrush removal treatments. The average sagebrush cover of each site one year before treatment was subtracted from the average sagebrush cover post treatment. The same calculation was applied to adjacent untreated areas. On average, percent bare ground increased by 10% in the treated plots and did not change in the untreated plots. The change in average herbaceous cover was not significantly different between the treated and untreated plots. The results of the percent shrub cover measured with Landsat imagery were congruent with the findings of other sagebrush removal studies. Other researchers have shown that multiple sagebrush removal techniques on average resulted in a 14% decrease of sagebrush. The images of FIG. 7 illustrate the results of each of the different temporal and spatial scales analyzed.

This study incorporated field-based high-resolution imagery, as an alternative to traditional field plots, to train satellite based remotely-sensed imagery and extract relevant cover information continuously across a landscape. Estimates of percent cover derived from high spatial resolution Ikonos satellite imagery was then used to train Landsat imagery to estimate percent cover over a large landscape across multiple years. The combination of GBVP, Ikonos, and Landsat spatial and temporal scales provide a framework that gives a manager a current snapshot of percent ground cover that can be compared with historic imagery. The ability to estimate historic percent canopy cover provides important information to evaluate the effectiveness of previous management actions as well as guide future management decisions aimed at maximizing ecosystem services such as the production of food, fiber, domestic grazing, wildlife, recreation opportunities, carbon sequestration, and water quality and quantity.

The advantage of GBVP images is that investigators can record and preserve actual field conditions in space and time. This provides a more transparent and repeatable field-level estimation of canopy cover. Field-based high-resolution vertical imagery captures, in space and time, actual percent cover of the vegetation being measured. Because of this, a visual history of percent cover can be maintained for comparison with future assessments or applied to more advanced classification techniques. This repeatability of measurements makes field observations more transparent. Additionally, methodological tests have found that 2,000 measurements per ground sample are necessary to estimate cover when that functional group's cover is less than 8%. Each GBVP image contains 18 million measured data points.

The Ikonos 1 m scale images were used to map percent canopy cover continuously across the landscape at high spatial detail—a capability outside the GBVP technique as well as traditional ground-based sampling. Mapping percent cover accurately across large landscapes provides land managers with evaluative power not available with limited point-based samples. The power of the Landsat 30 m derived percent cover maps provides not only the ability to extrapolate to larger landscapes, but also takes advantage of the unprecedented 39-year history of the Landsat program. This unique ability to capture rangeland percent cover for a significant time period provides managers with a contextual perspective that is not always (or ever was) available.

Enhanced ground sampling with high resolution, multiple spatial and temporal scale assessments can be used to address many pressing issues in range management. These include the landscape level estimation of percent cover, the temporal variation in percent cover, and assessing impacts due to disturbance and management prescriptions. These data can address the aforementioned problem of grazing allotment renewals. BLM grazing allotment renewal is dependent on the assessment of four standards of rangeland health. The first three standards are: 1) properly functioning watersheds; 2) properly functioning water, nutrient and energy cycles; and 3) water quality meeting state standards. Potentially, each of these standards can be addressed by estimating percent cover of bare ground within a watershed and how the extent bare ground has changed over time.

The fourth BLM standard is "habitat for a special status species". Currently, the greater sage-grouse (Centrocercus urophasianus) has been identified by the Endangered Species Act as a warranted species for protection. Sage-grouse are a species that depend on sagebrush communities throughout all phases of its life cycle. In the Sage-grouse Habitat Assessment Framework (HAF), states that, "monitoring is a primary tool for applying effective adaptive management strategies in conservation and fulfilling the commitments in the Greater Sage-grouse Comprehensive Conservation Strategy". Other researchers have described four orders of habitat selection by sage-grouse across a range of scales. These orders are scale-dependent and give context to habitat conservation so policies and practices can work congruently. The process described in this paper provides spatially-explicit information at all four geographic scales. The presence of sagebrush, bare ground, and herbaceous plants can be assessed over every square meter throughout the entire extent of sage-grouse habitat. Additionally, landcover classification projects like the Southwest ReGap can denote adjacent landcover types (e.g., juniper, agriculture, etc.). This provides spatially-explicit information of the availability, extent, and connectedness of sagebrush and other important habitat conditions (e.g., riparian areas, roads, and agriculture) for large geographic extents. It also defines the shelter and food availability at the site-scale that directly affects individual fitness, survival, and reproductive potential. This information can help guide policies, practices and support mitigation efforts in a cost effective manner.

The method disclosed herein shows that the integration of high-resolution imagery, e.g. ground-based vertical imagery, as enhanced ground samples with multiple scales of remotely sensed imagery can be used to effectively model cover components within sagebrush dominated landscapes. By assessing landscapes with high resolution imagery integrated with multiple scales of remotely sensed imagery, validated with traditional on-the-ground methods, the spatial and temporal limitations of traditional field-based rangeland monitoring can be mitigated. Spatial variation that cannot be addressed with point-based sampling is overcome by using high-resolution satellite based imagery. Temporal variation is overcome with yearly assessments from radiometrically calibrated imagery. This temporal ability helps evaluate long-term trends in percent cover and also provides better knowledge of the influence of annual weather patterns. The system and method thus allows temporal change analysis, and also provides the ability to normalize for climatic variation and to detect other sources of changes. This technique, applied across time, has potential to place cover change in a contextual perspective that has not been available before. In this way, past management practices can be evaluated for their effectiveness in altering rangeland percent cover and with this hindsight, improved management prescriptions can be developed.

Although various embodiments have been shown and described, the present disclosure is not so limited and will be understood to include all such modifications and variations are would be apparent to one skilled in the art.

What is claimed is:

1. A method of monitoring changes in rangeland, comprising:
at a processor:
developing percent coverage data representing percent coverage of each functional group of vegetation in each image of high resolution imagery of the rangeland;
producing detailed ground samples from the percent coverage data; using mid resolution imagery of the rangeland and the percent coverage data together to model a percent cover of each functional group for each pixel, and developing a landscape level characterization of the rangeland;
using low resolution historical imagery of the rangeland and the percent cover of each functional group for each pixel together to develop a temporal landscape characterization of the rangeland;
combining the detailed ground samples, the landscape level characterization, and the temporal landscape characterization into a digital map of vegetative cover components of the rangeland; and
evaluating the rangeland based on the digital map.

2. The method of claim 1, wherein developing the percent coverage data comprises classifying each pixel of the high resolution imagery into functional groups.

3. The method of claim 1, wherein the high resolution imagery has a resolution of less than 10 mm.

4. The method of claim 1, wherein the mid resolution imagery has a resolution of 1 m.

5. The method of claim 1, wherein the low resolution imagery has a resolution of 30 m.

6. The method of claim 5, wherein the low resolution imagery comprises historical imagery taken with regularity and frequency, thus enabling temporal change analysis.

7. The method of claim 1, wherein the digital map is incorporated into a global information system for the rangeland.

* * * * *